US007815242B2

(12) United States Patent
Yoshida et al.

(10) Patent No.: US 7,815,242 B2
(45) Date of Patent: Oct. 19, 2010

(54) AUTOMATIC OPENING/CLOSING APPARATUS FOR VEHICLE

(75) Inventors: Yasushi Yoshida, Kiryu (JP); Yoshitaka Sekine, Kiryu (JP); Yoshitaka Urano, Kiryu (JP); Hiroshi Eguchi, Kiryu (JP); Satoshi Nagamoto, Kiryu (JP)

(73) Assignee: Mitsuba Corporation, Kiryu-Shi (JP)

( * ) Notice: Subject to any disclaimer, the term of this patent is extended or adjusted under 35 U.S.C. 154(b) by 228 days.

(21) Appl. No.: 12/022,343

(22) Filed: Jan. 30, 2008

(65) Prior Publication Data

US 2008/0179919 A1 Jul. 31, 2008

(30) Foreign Application Priority Data

Jan. 31, 2007 (JP) ............................. 2007-022266
Jan. 18, 2008 (JP) ............................. 2008-009416

(51) Int. Cl.
*B60J 5/04* (2006.01)
*E05F 15/10* (2006.01)

(52) U.S. Cl. ....................... 296/146.4; 296/155; 49/360

(58) Field of Classification Search ............. 296/146.4, 296/155; 49/360
See application file for complete search history.

(56) References Cited

U.S. PATENT DOCUMENTS 5,913,563 A * 6/1999 Watanabe et al. ........... 296/155
7,568,310 B2 * 8/2009 Sato et al. ..................... 49/360
2005/0055883 A1 * 3/2005 Sato et al. ..................... 49/360
2006/0112643 A1 * 6/2006 Yokomori et al. ............. 49/360
2008/0178529 A1 * 7/2008 Yoshida et al. ................ 49/352
2009/0007496 A1 * 1/2009 Yokomori et al. ............. 49/360
2009/0019776 A1 * 1/2009 Ohtaki et al. ................. 49/360

FOREIGN PATENT DOCUMENTS

JP 2003-269040 9/2003

* cited by examiner

*Primary Examiner*—Patricia L Engle
(74) *Attorney, Agent, or Firm*—McCormick, Paulding & Huber LLP

(57) ABSTRACT

An automatic opening/closing apparatus for vehicle is downsized, and cost of the automatic opening/closing apparatus is reduced by reducing the number of its components. A driving drum is rotatably accommodated in a main body case of a driving unit, and one ends of cables are connected to a sliding door and the other ends are wound around the driving drum. An electric motor is attached to the main body case, and the driving drum is driven for rotation. A tensioner mechanism applying a predetermined tension to the cables is accommodated in the main body case. A control device, including a control substrate and a substrate case for accommodating the control substrate, is disposed to be overlapped on an axial-directional side of the driving drum to a portion of the main body case for accommodating the tensioner mechanism, whereby an operation of the electric motor is controlled by the control device.

2 Claims, 12 Drawing Sheets

AUTOMATIC OPENING/CLOSING APPARATUS FOR VEHICLE

CROSS-REFERENCE TO RELATED APPLICATIONS

Applicant hereby claims foreign priority benefits under U.S.C. §119 from Japanese Patent Application No. 2007-22266 filed on Jan. 31, 2007 and No. 2008-009416 filed on Jan. 18, 2008, the contents of which are incorporated by reference herein.

TECHNICAL FIELD OF THE INVENTION

The present invention relates to an automatic opening/closing apparatus for vehicle, which automatically opens and closes an open/close member provided on a vehicle body.

BACKGROUND OF THE INVENTION

Conventionally, a vehicle such as a wagon and a minivan is provided with, at a side part of its body, a sliding door that is opened and closed in vehicle-front and vehicle-back directions, thereby allowing passengers or merchandise to be easily loaded or unloaded from a side direction of the vehicle. This sliding door can normally be opened and closed by a manual operation. However, in recent years, there is also often found such a vehicle that the automatic opening/closing apparatus is mounted on the vehicle to automatically open and close the sliding door.

This automatic opening/closing apparatus is known as a cable type in which a cable (cable member) connected to the sliding door from the vehicle-front and vehicle-back directions is guided to a driving unit disposed in the vehicle body via reverse pulleys disposed at both ends of a guide rail; the cable is wound around a driving drum provided to the driving unit; and this drum is driven for rotation by a driving source such as an electric motor so that the sliding door is automatically opened and closed while being drawn by the cable. In this case, a reduction-mechanism equipped motor in which a motor main body and a reduction mechanism are formed as one unit is used as the electric motor, wherein a case is fixed to this electric motor and a tensioner mechanism for applying a predetermined tension to the drum and the cable is accommodated in the case.

Meanwhile, in order to control an operation of the electric motor, the automatic opening/closing apparatus is provided with a control device. For example, Patent Document 1 (Japanese Patent Application Laid-Open Publication No. 2003-269040) discloses an automatic opening/closing apparatus in which a control device is fixed to a bracket for fixing a driving unit to a vehicle body so as to be shifted in a predetermined direction with respect to the driving unit; and this control device and the driving unit are connected via an external harness.

SUMMARY OF THE INVENTION

In the automatic opening/closing apparatus disclosed in Patent Document 1however, the control device is provided separately from the driving unit and is disposed so as to be shifted in the predetermined direction with respect to the driving unit. Therefore, a projection area of the entire apparatus is increased, and the automatic opening/closing apparatus is made large. Moreover, since the control device is provided separately from the driving unit, it is required to provide the control device with a substrate case for accommodating a control substrate separately from a main body case of the driving unit and also to provide an external harness or the like for connecting the control device and the driving unit. Therefore, the number of its components is increased, and the cost of the automatic opening/closing apparatus rises.

An object of the present invention is to downsize an automatic opening/closing apparatus for vehicle.

Another object of the present invention is to reduce costs of the automatic opening/closing apparatus for vehicle by reducing the number of its components.

An automatic opening/closing apparatus for vehicle according to the present invention is an apparatus for automatically opening and closing an open/close member provided to a vehicle body, and comprising: a main body case disposed in the vehicle body; a driving rotor member accommodated in the main body case, and driven for rotation by a driving source; a cable member whose one end is wound around the driving rotor member and whose the other end is connected to the open/close member; a tensioner mechanism accommodated in the main body case so as to be adjacent to the driving rotor member in a diameter direction, the tensioner mechanism applying a predetermined tension to the cable member; and a control device disposed so as to be overlapped on an axial-directional side of the driving rotor member with respect to a portion of the main body case for accommodating the tensioner mechanism, the control device controlling an operation of the driving source.

The automatic opening/closing apparatus for vehicle according to the present invention is such that the main body case is provided with a reduction-mechanism housing accommodating a reduction mechanism for decelerating rotation of the driving source, and the control device is provided in a side direction of the reduction-mechanism housing.

The automatic opening/closing apparatus for vehicle according to the present invention is such that the control device includes a substrate case fixed to the main body case, and a control substrate accommodated in the substrate case.

According to the present invention, the control device is disposed so as to be overlapped on the axial-directional side of the driving drum with respect to a portion of the main body case for accommodating the tensioner mechanism. Therefore, the projection area viewed from the axial direction of the driving drum can be reduced, whereby the automatic opening/closing apparatus for vehicle can be downsized.

According to the present invention, since the control device is disposed in the side direction of the reduction-mechanism housing of the main body case, the projection area of the driving unit viewed from the axial direction of the driving rotor member is reduced, whereby a space occupied by the driving unit can be reduced.

According to the present invention, since the control device is configured so that the control substrate is accommodated inside the substrate case fixed to the main body case, the main body case and the control device are integrally configured, whereby the automatic opening/closing apparatus for vehicle can be downsized. Also, since the control substrate is accommodated in the substrate case fixed to the main body case, the control substrate and the driving source can be directly connected. For this reason, an external harness or the like is not required, whereby the cost of the automatic opening/closing apparatus for vehicle can be reduced.

DESCRIPTION OF THE PREFERRED EMBODIMENTS

An embodiment according to the present invention will be described in detail below with reference to the drawings.

Figure 1:
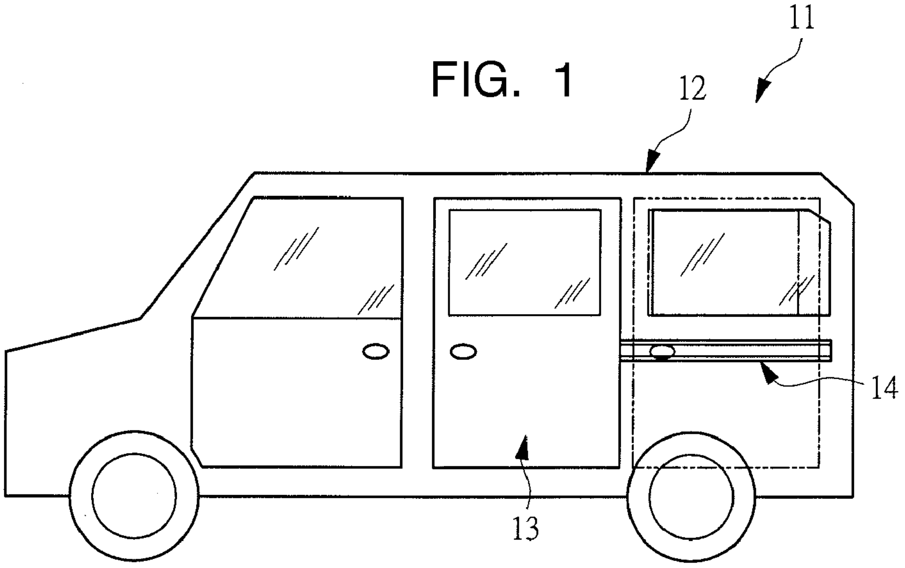
FIG. 1 is a side view of a minivan-type vehicle.
Figure 2:
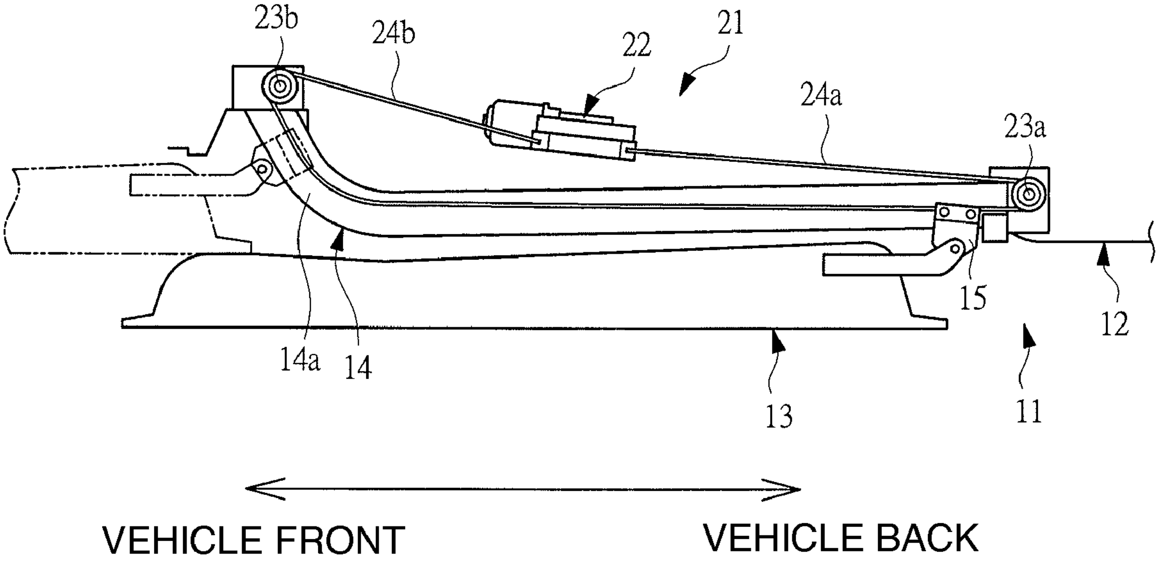
FIG. 2 is a plan view showing a structure of attaching a sliding door depicted in FIG. 1 to a vehicle body.

FIG. 1 is a side view showing a minivan-type vehicle, and FIG. 2 is a plan view showing a structure in which a sliding door depicted in FIG. 1 is attached to a vehicle body.

A side part of a vehicle body 12 in a vehicle 11 depicted in FIG. 1 is provided with a sliding door 13 as an open/close member. The sliding door 13 is guided along a guide rail 14 fixed to the side part of the vehicle body 12 so as to be freely opened and closed between a full-close position represented by solid lines and a full-open position represented by two-dot chains in FIG. 1. When passengers and merchandise are loaded or unloaded, the sliding door 13 is opened up to a predetermined ratio of opening and then is used.

As depicted in FIG. 2, the sliding door 13 is provided with a roller assembly 15. When this roller assembly 15 is guided along the guide rail 14, the sliding door 13 becomes movable in front and back directions of the vehicle 11. Also, a vehicle-front side of the guide rail 14 is provided with a curve portion 14*a* curved toward a vehicle compartment. When the roller assembly 15 is guided along the curve portion 14*a*, the sliding door 13 is closed in a state of being drawn inside the vehicle body 12 so as to be accommodated in the same plane as a side surface of the vehicle body 12. Although not shown, the roller assembly 15 is also provided to a portion (center portion) shown in the drawings as well as vertical portions (upper and lower portions) of a front end of the sliding door 13, and, correspondingly to these, the vertical portions of an opening of the vehicle body 12 are also provided with guide rails (not shown) so as to correspond to the upper and lower positions. Thus, the sliding door 13 is supported at three positions in total in the vehicle body 12.

This vehicle 11 is provided with an automatic opening/closing apparatus for vehicle 21 (hereinafter "opening/closing apparatus 21") for automatically opening and closing the sliding door 13. This opening/closing apparatus 21 includes: a driving unit 22 disposed inside the vehicle body 12 so as to be adjacent to an approximately center portion of the guide rail 14 in vehicle-front and vehicle-back directions; an open-side cable 24*a* as a cable member connected from an open side (vehicle-back side) to the roller assembly 15 (sliding door 13) via a reverse pulley 23*a* provided at an end of the guide rail 14 on the vehicle-back side; and a close-side cable 24*b* as a cable member connected from a close side (vehicle-front side) to the roller assembly 15 (sliding door 13) via a reverse pulley 23*b* provided at an end of the guide rail 14 on the vehicle-front side. When the open-side cable 24*a* is drawn by the driving unit 22, the sliding door 13 is caused to perform automatically an open operation. When the close-side cable 24*b* is drawn by the driving unit 22, the sliding door 13 is caused to perform automatically a close operation.

Figure 3:
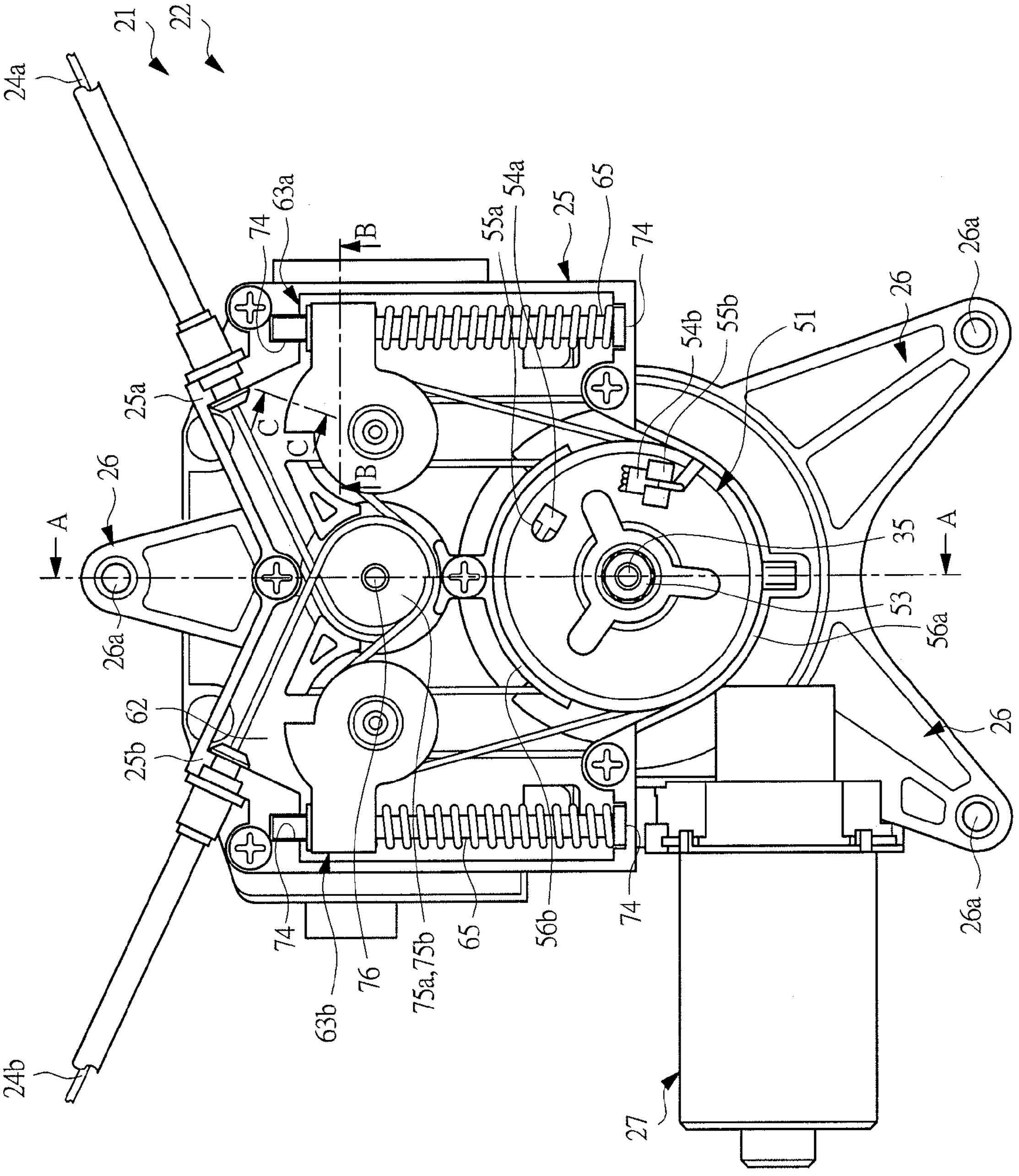
FIG. 3 is a front view showing a detail of a driving unit depicted in FIG. 2.
Figure 4:
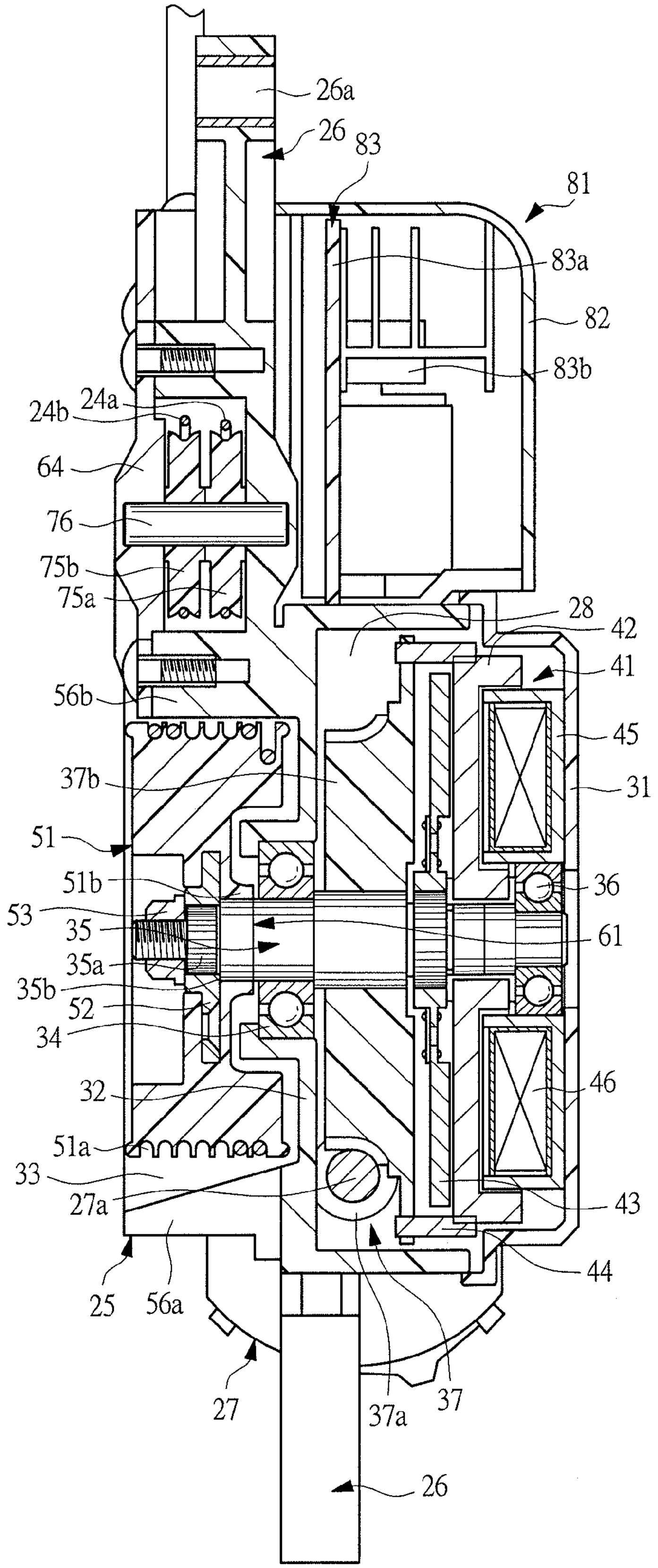
FIG. 4 is a sectional view taken along line A-A in FIG. 3.

FIG. 3 is a front view showing a detail of the driving unit depicted in FIG. 2, and FIG. 4 is a sectional view taken along line A-A in FIG. 3.

As depicted in FIGS. 3 and 4, the driving unit 22 includes a main body case 25 made of a resin. As depicted in FIG. 3, the main body case 25 has three attaching legs 26, each of the attaching legs 26 is provided with a bolt hole 26*a*, wherein the main body case 25, that is, the driving unit 22 is fixed to a panel of the vehicle body 12 by a bolt (not shown) inserted into each bolt hole 26*a*.

An electric motor 27 serving as a driving source of this driving unit 22 is attached to the main body case 25. As the electric motor 27, a bush-equipped direct-current motor is used, wherein its rotating shaft 27*a* is rotatable in positive and negative directions. Incidentally, although the brush-equipped electric motor 27 is used as a driving source in the present embodiment, the present invention is not limited to this embodiment and may use another electric motor such as a brushless motor.

As depicted in FIG. 4, the main body case 25 is provided with a reduction-mechanism housing 28. This reduction-mechanism housing 28 is enclosed by a resin-made cover 31 attached to the main body case 25. The electric motor 27 is attached to the main body case 25 adjacently to the reduction-mechanism housing 28, wherein its rotating shaft 27*a* protrudes inside the reduction-mechanism housing 28. The main body case 25 is provided with a drum housing 33 adjacent to the reduction-mechanism housing 28 via a partition wall 32, and a driving shaft 35 is rotatably supported in the main body case 25 by a bearing 34 mounted on the partition wall 32. The driving shaft 35 is disposed across the reduction-mechanism housing 28 and the drum housing 33, and its basal end protrudes inside the reduction-mechanism housing 28 and is rotatably supported in the cover 31 by a bearing 36.

A reduction mechanism 37 is accommodated in the reduction-mechanism housing 28, and the rotation of the rotating shaft 27*a* is decelerated by the reduction mechanism 37 up to a predetermined revolution and is transmitted to the driving shaft 35. That is, the driving shaft 35 is driven and rotated by the electric motor 27. The reduction mechanism 37 forms a worm-gear mechanism including a worm 37*a* and a worm wheel 37*b*. The worm 37*a* is formed integrally with the rotating shaft 27*a* on an outer circumferential surface of the rotating shaft 27*a*. The worm wheel 37*b* is relatively rotatably supported by the driving shaft 35 and is rotatable inside the main body case 25.

An electromagnetic clutch 41 is accommodated in the reduction-mechanism housing 28, and motive-power transmission between the worm wheel 37*b* and the driving shaft 35 is intended to be intermitted by this electromagnetic clutch 41. The electromagnetic clutch 41 is a so-called friction type including a rotor 42 and an armature 43 which are disposed so as that their friction surfaces oppose to each other. The rotor 42 is relatively rotatably supported by the driving shaft 35, and is also coupled to the worm wheel 37*b* via a ring member 44, thereby being rotated together with the worm wheel 37*b*. On the other hand, the armature 43 is coupled to the driving shaft 35 via a leaf spring, thereby rotating together with the driving shaft 35 and being movable within a predetermined range in the axial direction. A clutch yoke 45 is disposed on a rear surface of the rotor 42, and a clutch coil 46 is accommodated in the clutch yoke 45. When a current is carried in the clutch coil 46, the armature 43 is attracted to the clutch yoke 45. Therefore, when the current is carried in the clutch coil 46, the friction surfaces of the rotor 42 and the armature 43 are pressed and connected to each other and the electromagnetic clutch 41 becomes in a connecting state, whereby motive power is transmitted between the worm wheel 37*b* that is, the electric motor 27 and the driving shaft 35. Conversely, when the current to the clutch coil 46 is stopped, a friction force between the rotor 42 and the armature 43 is reduced and the electromagnetic clutch 41 becomes in an intermitted state, whereby a motive-power transmission path between the worm wheel 37*b* and the driving shaft 35 is intermitted.

In the drum housing 33, a driving drum 51 as a driving rotator is rotatably accommodated. The driving drum 51 is made of a resin material and formed into such a cylindrical shape as to have a guide groove 51*a* on its outer circumferential surface, and has a cylindrical boss portion 51*b* at its axial center. In this boss portion 51*b*, the driving drum 51 is mounted on a tip of the driving shaft 35. That is, the driving drum 51 is mounted on the driving shaft 35 so that the driving shaft 35 passes through the boss portion 51*b*. A metal-made reinforcing member 52 is embedded in the driving drum 51 so as to be shifted in an axial direction with respect to the boss portion 51*b*. This reinforcing member 52 is engaged with serrations 35*a* provided to the driving shaft 35. Also, the reinforcing member 52 abuts on a step portion 35*b* of the driving shaft 35 to position the driving drum 51 in the axial direction, thereby positioning the driving drum 51 in the axial direction. In this state, the driving drum 51 is fixed to the tip of the driving shaft 35 by a nut 53. For this reason, when the electric motor 27 is actuated, the driving drum 51 rotates together with the driving shaft 35. That is, the driving drum 51 is driven and rotated by the electric motor 27.

The open-side cable 24*a* guided by the driving unit 22 is drawn in the main body case 25 from a cable drawing portion 25*a* provided to the main body case 25. A cable end 54*a* provided to a terminal end of the open-side cable 24*a* is fixed to a securing portion 55*a* formed in an axial-directional end face of the driving drum 51 that is located on an opposite side to the partition wall 32, and simultaneously the open-side cable 24*a* is wound around the driving drum 51 from a side of the axial-directional end face along the guide groove 51*a*. Similarly, the close-side cable 24*b* guided by the driving unit 22 is drawn in the main body case 25 from a cable drawing portion 25*b* provided to the main body case 25. A cable end 54*b* provided to a terminal end of the close-side cable 24*b* is fixed to a securing portion 55*b* formed in the axial-directional end face of the driving drum 51 that is located on an open side of the case, and simultaneously the close-side cable 24*b* is wound around the driving drum 51 from the side of the axial-directional end face along the guide groove 51*a* in the same direction as that of the open-side cable 24*a*.

The drum housing 33 is formed so as to be partitioned by the partition wall 32 and a pair of semi-cylindrical outer circumferential walls 56*a* and 56*b* protruding from and formed at the partition wall 32 in the axial direction. A portion between these outer circumferential walls 56*a* and 56*b* forms a cable drawing portion. The outer circumferential surface of the driving drum 51 is covered with these outer circumferential walls 56*a* and 56*b* except for the cable drawing portion, whereby the cables 24*a* and 24*b* are protected from contacting with foreign matters, for example. Also, an interval between the outer circumferential surface of the driving drum 51 and inner surfaces of the outer circumferential walls 56*a* and 56*b* is equal to or smaller than a diameter of each of the cables 24*a* and 24*b*. For this reason, the cables 24*a* and 24*b* wound around the driving drum 51 are held inside the guide groove 51*a* by the outer circumferential walls 56*a* and 56*b*, thereby preventing the cables 24*a* and 24*b* from being released from the driving drum 51.

Incidentally, in the present embodiment, the outer circumferential walls 56*a* and 56*b* are formed so as to cover the outer circumferential surface of the driving drum 51 within a range of excluding the cable drawing portion. However, the present invention is not limited to this, and the outer circumferential walls 56*a* and 56*b* may be arbitrarily set in size and shape so long as they cover at least a part of the outer circumferential surface of the driving drum 51.

Figure 5:
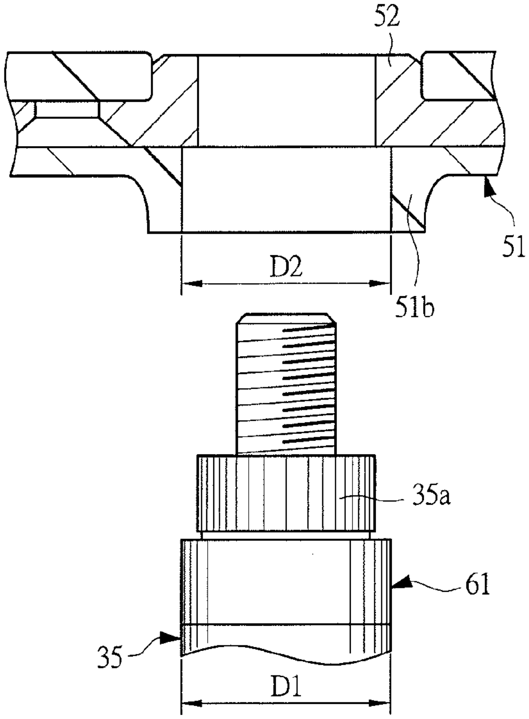
FIG. 5 is a sectional view showing a detail of a temporary holding unit provided to a driving shaft.
Figure 6:
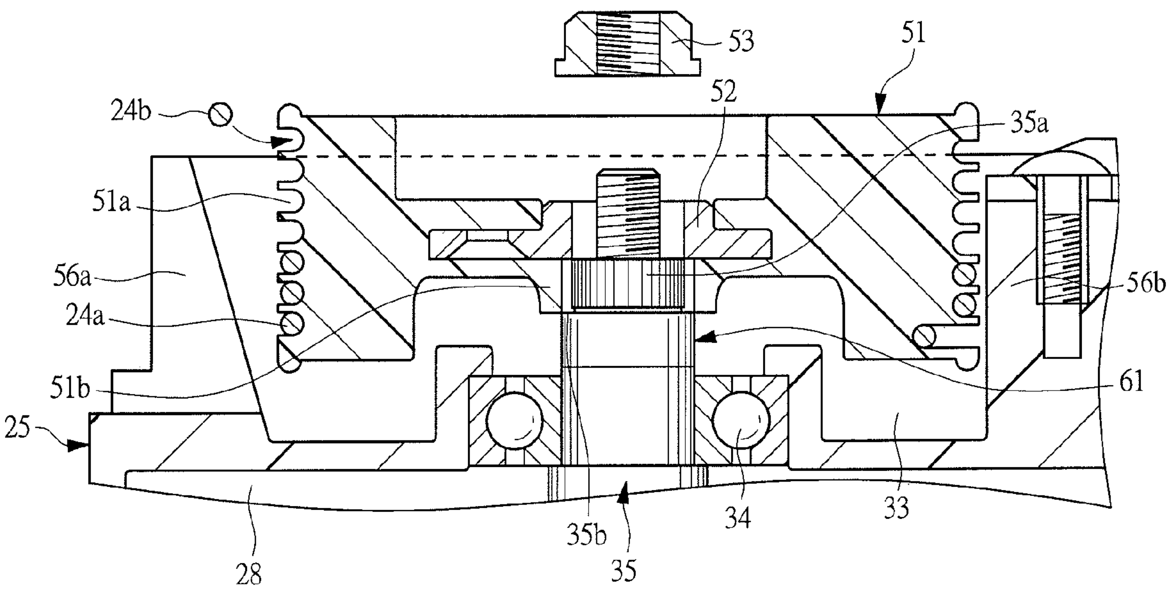
FIG. 6 is a sectional view showing a state where a driving drum is temporarily held by the temporary holding unit.
Figure 7A:
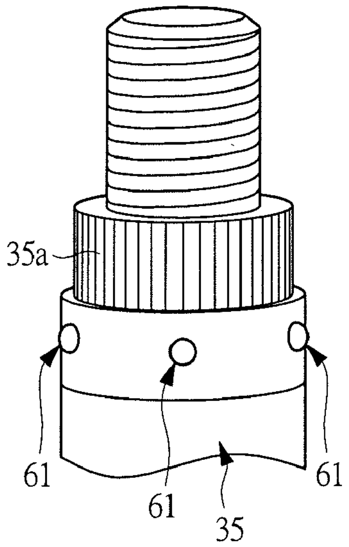
FIG. 7A is a perspective view showing a modification example of the temporary holding unit depicted in FIG. 5.
Figure 7B:
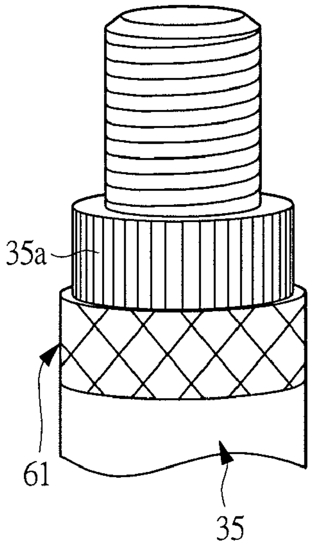
FIG. 7B is a perspective view showing a modification example of the temporary holding unit depicted in FIG. 5.
Figure 7C:
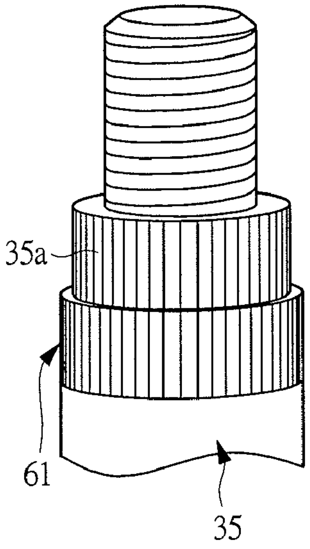
FIG. 7C is a perspective view showing a modification example of the temporary holding unit depicted in FIG. 5.

FIG. 5 is a sectional view showing a detail of a temporary holding unit provided to the driving shaft; FIG. 6 is a sectional view showing a state where the driving drum is temporarily held by the temporary holding unit; and FIGS. 7A to 7C are perspective views each showing a modification example of the temporary holding unit depicted in FIG. 5.

In this opening/closing apparatus 21, a temporary holding unit 61 is provided to facilitate a winding operation of each of the cables 24*a* and 24*b* around the driving drum 51. The temporary holding unit 61 is provided to the driving shaft 35, and is formed into such a columnar shape as to be aligned axially with respect to serrations 35, thereby being engaged with a boss portion 51*b* when the driving drum 51 is mounted on the driving shaft 35. Here, as depicted in FIG. 5, a diameter D1 of the temporary holding unit 61 is formed slightly larger than an inner diameter D2 of the boss portion 51*b* of the driving drum 51, whereby the temporary holding unit 61 functions as a light pressuring unit for the boss portion 51*b*. That is, when the driving drum 51 is pushed axially toward the driving shaft 35 with a predetermined load equal to or larger than self weight of the driving drum 51, the boss portion 51*b* is pressed into the temporary holding unit 61 so as to allow the driving drum 51 to be mounted at a normal fixing position, that is, a position where the reinforcing member 52 abuts on the step portion 35*b*. Therefore, even if the driving drum 51 is mounted on the driving shaft 35, the boss portion 51*b* is not pressed into the temporary holding unit 61 with the self weight of the driving drum 51 and, as depicted in FIG. 6, the driving drum 51 is temporarily held by the temporary holding unit 61 at a temporary holding position before the normal fixing position while the boss portion 51*b* is engaged with the temporary holding unit 61. At this time, the outer circumferential surface of the driving drum 51 protrudes, one winding of the cable around the guiding groove 51*a*axially from the drum housing 33, that is, the outer circumferential walls 56*a* and 56*b*.

Next, a procedure for winding the cables 24*a* and 24*b* around the driving drum 51 in the opening/closing apparatus 21 provided with this temporary holding unit 61 will be described.

First, the cable end 54*a* of the open-side cable 24*a* is fixed to the securing portion 55*a* of the driving drum 51, and the open-side cable 24*a* is wound around the driving drum 51 by the predetermined number of turns from the side of the axial-directional end face located on a side of the driving drum 51 opposite to the partition wall 32 along the guide groove 51*a*. Next, the driving drum 51 around which the open-side cable 24*a* is wound is inserted into the drum housing 33 from the axial direction, and is mounted on the driving shaft 35 in the boss portion 51*b*. At this time, the open-side cable 24*a* wound around the driving drum 51 is drawn outside the drum housing 33 from the cable drawing portion located between the outer circumferential walls 56*a* and 56*b*. When the driving drum 51 is mounted on the driving shaft 35, the boss portion 51*b* is engaged with the temporary holding unit 61 provided to the driving shaft 35. As depicted in FIG. 6, the driving drum 51 is held by the temporary holding unit 61 at the temporary holding position before the normal fixing position.

When the driving drum 51 is temporarily held by the temporary holding unit 61, one winding of the cable in the guide groove 51*a* protrudes from the outer circumferential walls 56*a* and 56*b* in the axial direction and is exposed to the outside. In this state, the cable end 54*b* of the close-side cable 24*b* is fixed to the securing portion 55*b* of the drum 51, and simultaneously the cable 24*b* is wound around the guide groove 51*a* protruding from the outer circumferential walls 56*a* and 56*b* of the driving drum 51. In this manner, the driving drum 51 is temporarily held by the temporary holding unit 61, and a part of the guide groove 51*a* protrudes from the outer circumferential walls 56*a* and 56*b* in the axial direction, so that when performing work of winding the close-side cable 24*b* around the driving drum 51, an operator does not have to hold, with his/her hands, a state where the driving drum 51 is withdrawn from the drum housing 33, thereby facilitating the work of winding the cables 24*a* and 24*b* around the driving drum 51.

When the close-side cable 24*b* is wound around the driving drum 51, the nut 53 is then screwed in the tip of the driving shaft 35. By fastening this nut 53, the boss portion 51*b* is pressed into the temporary holding unit 61 with a predetermined load or more. Then, when the driving drum 51 is moved up to the normal fixing position, the reinforcing member 52 abuts on the step portion 35*b* and is sandwiched between the nut 53 and the step portion 35*b*, whereby the driving drum 51 is fixed to the driving shaft 35. Incidentally, in the present embodiment, the boss portion 51*b* is pressed into the temporary holding unit 61 by fastening the nut 53 thereto. However, the present invention is not limited to this, and the operator may push the driving drum 51 with the hands to press the boss portion 51*b* into the temporary holding unit 61 and then fasten the nut 53 thereto.

In this manner, in the opening/closing apparatus 21, the driving shaft 35 is provided with the temporary holding unit 61, and the driving drum 51 mounted on the driving shaft 35 is temporarily held by the temporary holding unit 61 in a state where a part of the driving drum 51 protrudes from the outer circumferential walls 56*a* and 56*b* in the axial direction. Therefore, holding the driving drum 51 with the hands becomes unnecessary, whereby the work of winding the cables 24*a* and 24*b* around the driving drum 51 can be facilitated.

In the present embodiment, the diameter D1 of the temporary holding unit 61 is formed so as to be slightly larger than the inner diameter D2 of the boss portion 51*b* of the driving drum 51. However, the present invention is not limited to this and, for example, as depicted in FIG. 7A, may have a structure in which the temporary holding unit 61 is formed as protrusions, which are formed at and protrude from the outer circumferential surface of the driving shaft 35, and the boss portion 51*b* of the driving drum 51 is pressed outside these protrusions. Also, as depicted in FIG. 7B, the present invention may have a structure in which the temporary holding unit 61 is formed by a surface processing such as knurling for roughening the outer circumferential surface of the driving shaft 35 to increase friction resistance with the boss portion 51*b* of the driving drum 51, thereby functioning as a light pressing unit. Furthermore, as depicted in FIG. 7C, the present invention may have a structure in which the temporary holding unit 61 is formed as serrations so that the boss portion 51*b* is pressed into this temporary holding unit 61. Still further, although not shown, a temporary holding function may be provided to a side of the boss portion 51*b*. For example, as in the above examples, the present invention may have a structure in which the diameter D1 of the temporary holding unit 61 is formed slightly larger than the inner diameter D2 of the boss portion 51*b* of the driving drum 51; the boss portion 51*b* of the driving drum 51 is provided with a slit or the like in the axial direction; and when the boss portion 51*b* is pressed into the temporary holding unit 61, the diameter of the boss portion 51*b* is increased.

Also, in the present embodiment, when the driving drum 51 is temporarily held by the temporary holding unit 61, its outer circumferential surface protrudes, only one winding of the cable, axially from the outer circumferential walls 56*a* and 56*b*. However, the present invention is not limited to this, and so long as at least a part of the driving drum 51 around which the cables 24*a* and 24*b* are wound protrudes from the outer circumferential walls 56*a* and 56*b* in the axial direction, its protrusion amount can be arbitrarily set.

Figure 8:
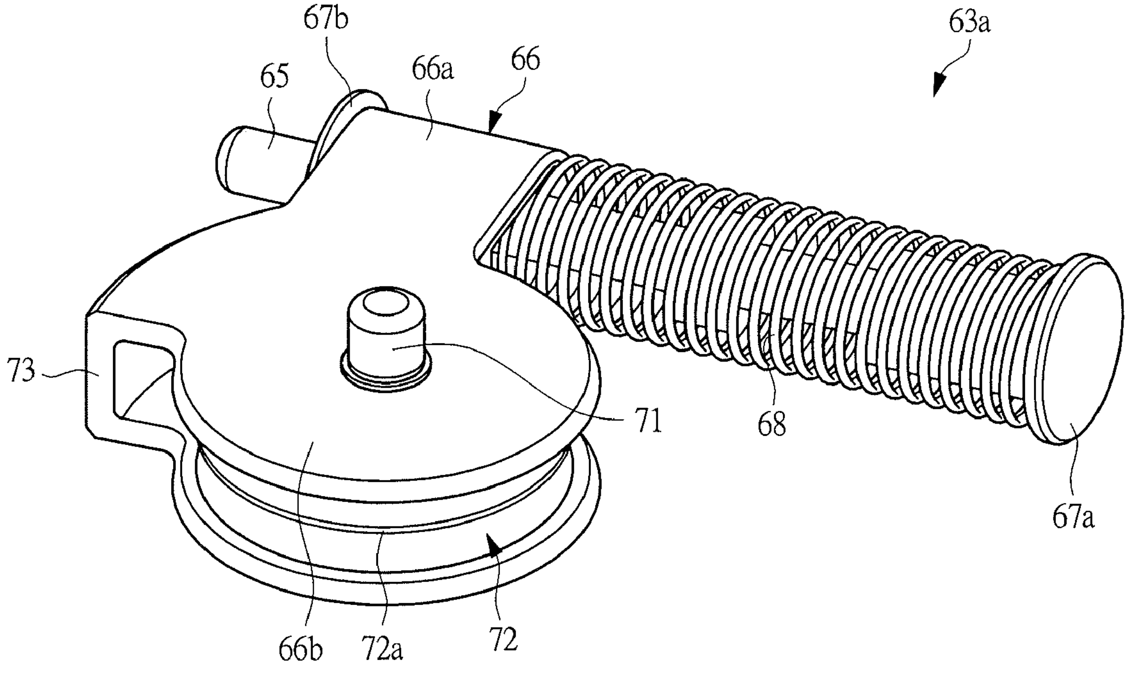
FIG. 8 is a perspective view showing a detail of a tensioner mechanism depicted in FIG. 3.
Figure 9:
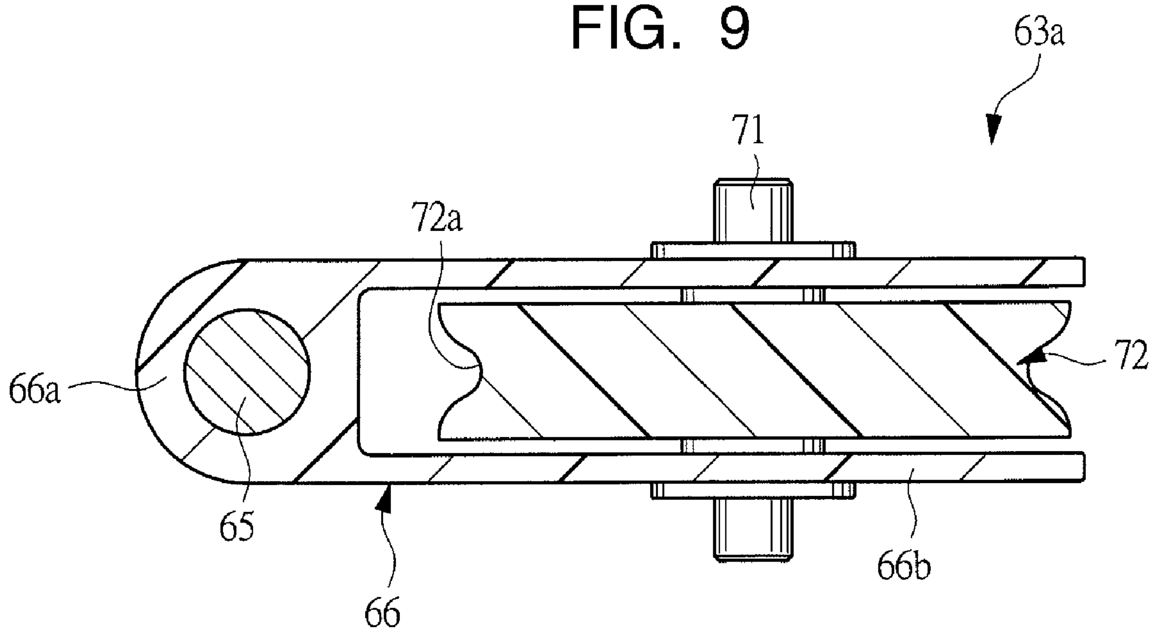
FIG. 9 is a sectional view taken along line B-B in FIG. 3.
Figure 10:
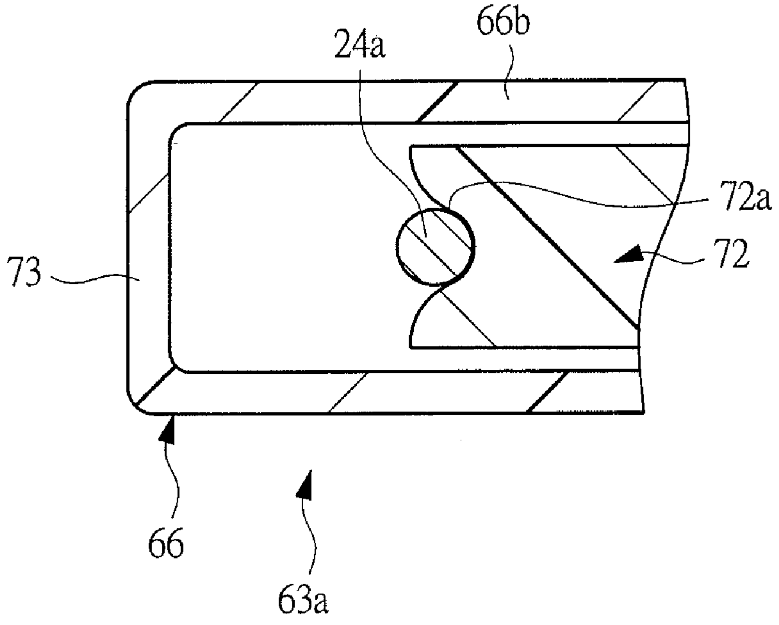
FIG. 10 is a sectional view taken along line C-C in FIG. 3.
Figure 11:
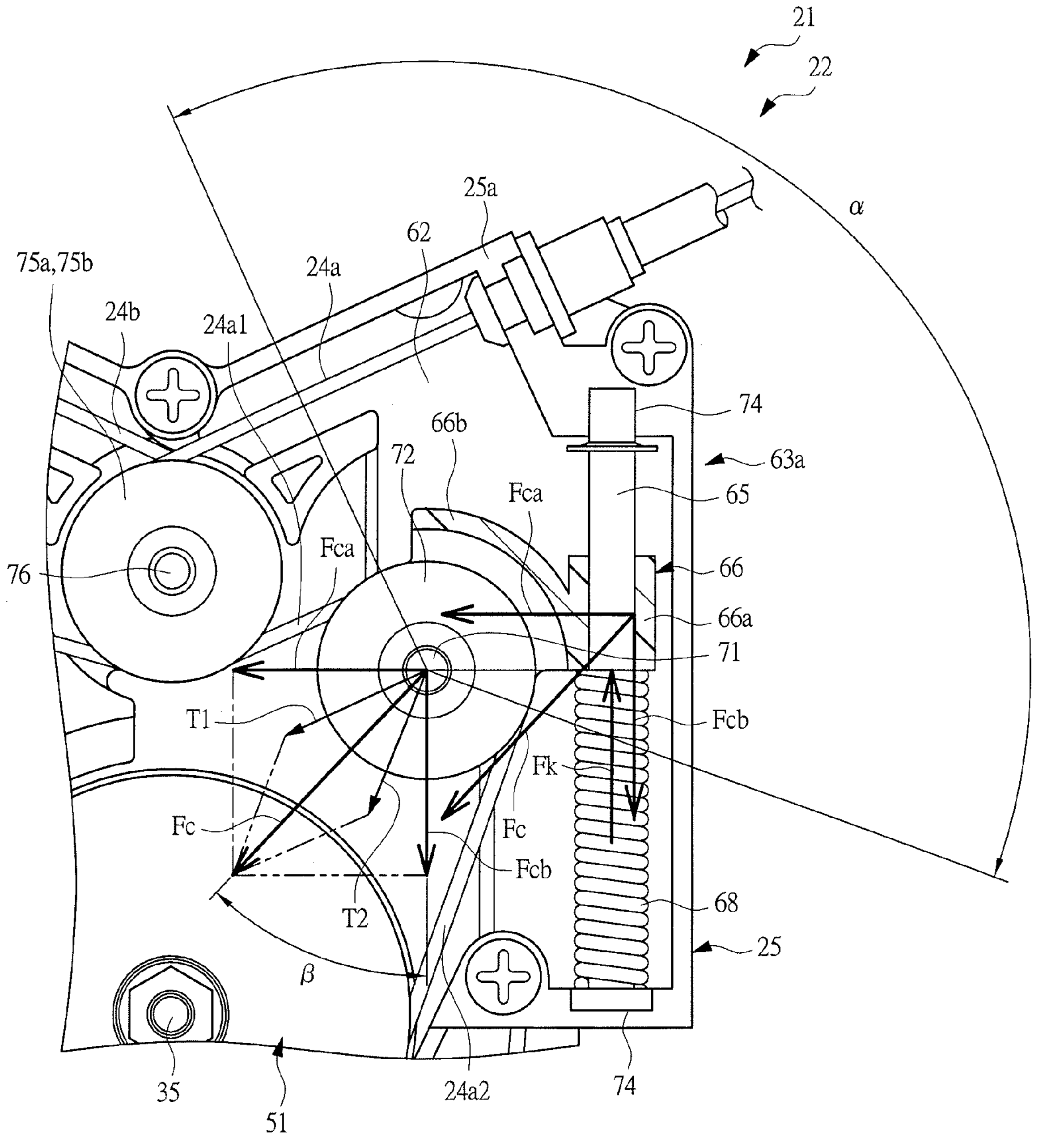
FIG. 11 is a front view showing an operating state of the tensioner mechanism depicted in FIG. 3.
Figure 12:
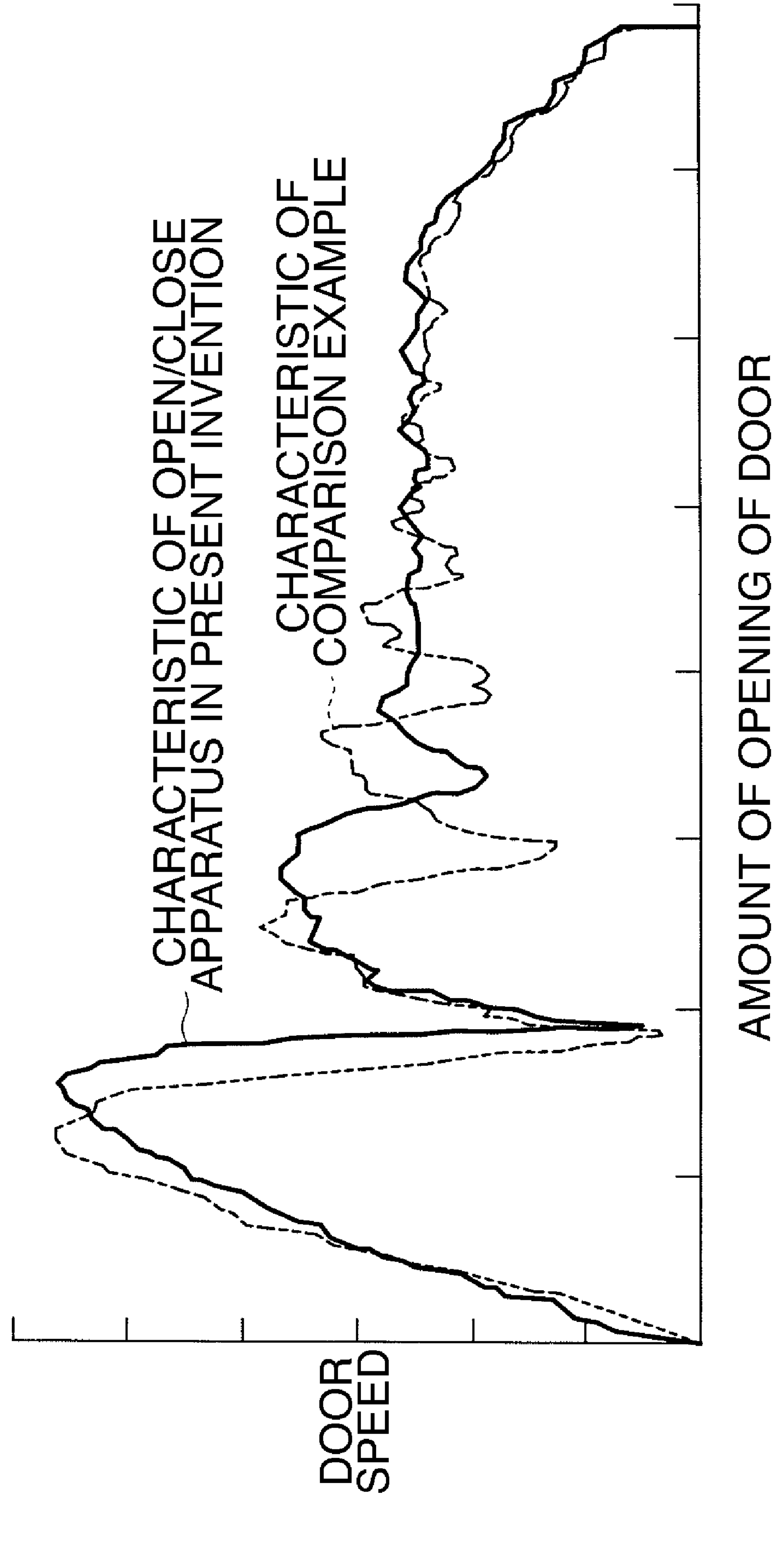
FIG. 12 is a characteristic diagram showing convergence characteristics of vibration of the tensioner mechanism by comparison with a comparison example.

FIG. 8 is a perspective view showing a detail of a tensioner mechanism depicted in FIG. 3; FIG. 9 is a sectional view taken along line B-B in FIG. 3; and FIG. 10 is a sectional view taken along line C-C in FIG. 3. FIG. 11 is a front view showing an operating state of the tensioner mechanism depicted in FIG. 3; and FIG. 12 is a characteristic diagram showing convergence characteristics of vibration of the tensioner mechanism by comparison with a comparison example.

As depicted in FIG. 3, the main body case 25 is provided with a tensioner housing 62 adjacently to the driving drum 51, that is, the drum housing 33 in a diameter direction (an upper side in the drawing) of the driving drum 51. In this tensioner housing 62, an open-side tensioner mechanism 63*a* for applying a predetermined tension to the open-side cable 24*a* and a close-side tensioner mechanism 63*b* for applying a predetermined tension to the close-side cable 24*b* are accommodated. Incidentally, as depicted in FIG. 4, the tensioner housing 62 is enclosed by a cover 64, and the tensioner mechanisms 63*a* and 63*b* are covered with the cover 64.

Details of the tensioner mechanisms 63*a* and 63*b* will be described below. Since the open-side tensioner mechanism 63*a* and the close-side tensioner mechanism 63*b* have basically the same structure, however, the open-side tensioner mechanism 63*a* will be mainly described below.

As depicted in FIG. 8, the open-side tensioner mechanism 63*a* (hereinafter referred to simply as the "tensioner mechanism 63*a*") includes a guide shaft 65 made of steel and formed into a rod shape with a circular section, and a resin-made pulley holder 66. The pulley holder 66 has a slide portion 66*a* formed into a cylindrical shape. This slide portion 66*a* is mounted on the guide shaft 65 movably along the guide shaft 65 and rotatably so as to be centered about an axial center of the guide shaft 65. For this arrangement, the pulley holder 66 is movable axially along the guide shaft 65 and rotatable about the guide shaft 65 so as to be centered about the axial center of the guide shaft 65.

Both ends of the guide shaft 65 are provided with stoppers 67*a* and 67*b*, and a range of moving the slide portion 66*a* is restricted between insides of these stoppers 67*a* and 67*b*. Also, between one stopper 67*a* and the slide portion 66*a*, a spring 68 as a spring member is mounted. The slide portion 66*a* is biased toward the other stopper 68 by this spring 68.

The pulley holder 66 includes a holder main body portion 66*b* formed integrally with the slide portion 66*a*. This holder main body portion 66*b* is disposed so as to be shifted to a side of the driving drum 51 with respect to the slide portion 66*a* and so that its axial center is shifted toward a side of the spring 68 along the axial direction of the guide shaft 65 with respect to an axial-directional center position of the slide portion 66*a*.

In the holder main body portion 66*b*, a movable pulley 72 is rotatably supported by a supporting shaft 71. The cable 24*a* drawn in the main body case 25 from the cable drawing portion 25*a* is bridged about the movable pulley 72, and is then guided to the driving drum 51. The movably pulley 72 is formed smaller in diameter than the driving drum 51, and its outer circumference is provided with a groove 72*a* having a V-shaped section so as to be engaged with the cable 24*a*. Also, in order to prevent the cable 24*a* from being released from the movable pulley 72, the holder main body portion 66*b* is provided with a guide wall 73 integrally with the holder main body portion 66*b*. This guide wall 73 is formed into such an arc shape as to oppose to an outer circumferential surface of the movable pulley 72 and to have a predetermined interval, thereby being formed within a range of approximately 90 degrees along the outer circumferential surface of the movable pulley 72 including portions overlapping the slide portion 66*a*. For this reason, as depicted in FIG. 10, the cable 24*a* wound about the movable pulley 72 is disposed between the movable pulley 72 and the guide wall 73. Therefore, even if the tension is extremely loosened and the cable 24*a* released from the movable pulley 72, the cable 24*a* is retained between the movable pulley 72 and the guide wall 73 and when the tension is recovered to fall within the proper range, the cable 24*a* is naturally engaged with the movable pulley 72.

The tensioner mechanism 63*a* is formed as one unit as depicted in FIG. 8 by assembling previously the guide shaft 65, the pulley holder 66, the spring 68, and the like, and is assembled to the main body case 25 while being unitized. The main body case 25 is provided with mounting grooves 74. The tensioner mechanism 63*a* is assembled to the tensioner housing 62 while both ends of the guide shaft 65 are supported by these mounting grooves 74.

As depicted in FIGS. 3 and 4, in the main body case 25, a pair of fixed pulleys 75*a* and 75*b* is rotatably supported by a supporting shaft 76 so as to be located inside the tensioner housing 62. These fixed pulleys 75*a* and 75*b* are mutually aligned axially and are each disposed between the tensioner mechanisms 63*a* and 63*b*. The open-side cable 24*a* drawn in the main body case 25 from the cable drawing portion 25*a* is wound around the movable pulley 72 of the tensioner mechanism 63*a* via the fixed pulley 75*a* from a predetermined direction, and the close-side cable 24*b* drawn in the main body case 25 from the cable drawing portion 25*b* is wound around the movable pulley 72 of the tensioner mechanism 63*b* via the fixed pulley 75*b* from a predetermined direction. Incidentally, the cable ends 54*a* and 54*b* of the cables 24*a* and 24*b* are each formed smaller than a gap between the guide wall 73 and an outer circumferential surface of the movable pulley 72, and are inserted between the guide wall 73 and the movable pulley 72 before the tensioner mechanisms 63*a* and 63*b* are each assembled to the main body case 25.

When the tensioner mechanism 63*a* is mounted on the main body case 25, the pulley holder 66, i.e., the movable pulley 72 is biased by the spring 68 along the guide shaft 65 in a direction of being separate from the driving drum 51 and fixed pulleys 75*a* and 75*b*. For this reason, a predetermined tension is applied to the open-side cable 24*a* by the open-side tensioner mechanism 63*a*. For example, when the roller assembly 15 is guided along the curve portion 14*a* of the guide rail 14 and drawing paths of the cables 24*a* and 24 become long, as depicted in FIG. 11, the movable pulley 72 moves along with the pulley holder 66 downward in the drawing along the guide shaft 65 against the spring force of the spring 68, thereby holding each tension of the cables 24*a* and 24*b* within a predetermined range.

Here, as depicted in FIG. 11, the guide shaft 65 of the tensioner mechanism 63*a* is supported by the main body case 25 so that its axial direction is parallel to a line segment connecting an axial center of the driving drum 51 and an axial center of the fixed pulleys 75*a* and 75*b*. The axial direction is tilted toward a direction of a load applied to the movable pulley 72 from the cable 24*a*. That is, the guide shaft 65 is supported by the main body case 25 so that its axial direction is tilted in a direction of a resultant force Fc of a tension T1 of an open-side cable 24*a*1 bridged between the movable pulley 72 and the fixed pulley 75*a* and a tension T2 of an open-side cable 24*a*2 bridged between the movable pulley 72 and the driving drum 51. Thus, friction resistance is increased between a component force Fca of the resultant force Fc orthogonal to the axial direction of the guide shaft 65 and the slide portion 66*a* moving along the guide shaft 65. In this state, the pulley holder 66 is moved along the guide shaft 65 up to a position where a component force Fcb of the resultant force Fc extending along the guide shaft 65 matches a spring force Fk of the sprint 68. Therefore, even if the load applied to the movable pulley 72 from the open-side cable 24*a*i.e., the resultant force Fc is rapidly changed to cause the pulley holder 66 to reciprocate axially along the guide shaft 65, i.e., vibrates, such vibration is attenuated due to sliding friction between the guide shaft 65 and the slide portion 66*a*.

In the state of FIG. 11, a condition for making the movable pulley 72 stand still axially is represented by $$Fk=2T\cdot\mathrm{SIN}(\alpha/2)*(\mathrm{COS}\ \beta-\mu 1\cdot\mathrm{SIN}\ \beta) \qquad \text{Equation 1,}$$

where "Fk" is the spring force of the spring 68, "α" is a winding angle of the cable 24*a* around the movable pulley 72, "β" is an angle formed between the resultant force Fc and the axial direction of the guide shaft 54, "μ1" is a coefficient of static friction, and "T1=T2=T".

Next, a condition for making the movable pulley 72 start moving from the state depicted in FIG. 11 in a lower direction of the drawing along the guide shaft 65 is, from Equation 1, $$Fk<2T\cdot\mathrm{SIN}(\alpha/2)*(\mathrm{COS}\ \beta-\mu 1\cdot\mathrm{SIN}\ \beta) \qquad \text{Equation 2,}$$

and a condition for making the movable pulley 72 continue moving axially along the guide shaft 65 is, from Equation 2, $$Fk<2T\cdot\mathrm{SIN}(\alpha/2)*(\mathrm{COS}\ \beta-\mu 2\cdot\mathrm{SIN}\ \beta) \qquad \text{Equation 3,}$$

if it is assumed that "μ2" is a coefficient of kinetic friction.

From Equations 2 and 3, it can be found that as the angle α comes near 180 degrees and the angle β comes near 0 (zero) degree, the movable pulley 72 can be easily moved in a direction extended along the guide shaft 65 and that as the angles α and β come near 90 degrees, the movable pulley 72 is difficult to move in the direction extending along the guide shaft 65. For this reason, in order to smoothly operate the movable pulley 72 in the lower direction of the drawing along the guide shaft 65, it is understood that the tension T of the cable 24*a* has to be sufficiently large with respect to the spring force Fk of the spring 68.

Next, a condition for making the movable pulley 72 start moving from the state depicted in FIG. 11 in an upper direction of the drawing along the guide shaft 65 is, from Equation 1, $$Fk>2T\cdot SIN(\alpha/2)*(COS\ \beta+\mu 1\cdot SIN\ \beta) \quad \text{Equation 4,}$$

and a condition for making the movable pulley 72 continue moving axially along the guide shaft 65 is, from Equation 4, $$Fk>2T\cdot SIN(\alpha/2)*(COS\ \beta+\mu 2\cdot SIN\ \beta) \quad \text{Equation 5,}$$

if it is assumed that "μ2" is a coefficient of kinetic friction.

From Equations 4 and 5, it can be found that as the angle α comes near 180 degrees and the angle β comes near 0 (zero) degree, the movable pulley 72 can be easily moved in the direction extending along the guide shaft 65 and that as the angles α and β come near 90 degrees, the movable pulley 72 is difficult to move in the direction extending along the guide shaft 65. For this reason, in order to smoothly operate the movable pulley 72 in the upper direction of the drawing along the guide shaft 65, it is understood that the tension T of the cable 24*a* has to be sufficiently small with respect to the spring force Fk of the spring 68.

As described above, in order to smoothly operate the movable pulley 72 along the guide shaft 65 and cause appropriate friction resistance to be generated between the guide shaft 65 and the slide portion 66*a*, the angle β formed between the resultant force Fc and the axial direction of the guide shaft 65 is desirably set at approximately 45 degrees. The present embodiment is configured so that when the sliding door 13 is moved near the full-close position and the roller assembly 15 is guided to the curve portion 14*a* of the guide rail 14, an angle formed between the resultant force Fc and the axial direction of the guide shaft 65 is approximately 45 degrees. For this reason, when the sliding door 13 is near the full-close position, the movable pulley 72 can be smoothly operated and also appropriate friction resistance is generated between the guide shaft 65 and the slide portion 66*a*, whereby vibration of the movable pulley 72 can be effectively suppressed.

Incidentally, in order to smoothly operate the movable pulley 72 along the guide shaft 65 and to cause the appropriate friction resistance to be generated between the guide shaft 65 and the slide portion 66*a*, even if the guide shaft 65 is not tilted with respect to the direction of the load applied to the movable pulley 72 from the cable 24*a*, the friction resistance can be generated by shifting the holder main body portion 66*b* to a side of the driving drum 51 with respect to the slide portion 66*a*.

In this opening/closing apparatus 21, the guide shaft 65 is tilted with respect to a direction of the load applied to the movable pulley 72 from the cable 24*a*, whereby the sliding resistance is caused to be generated between the guide shaft 65 and the slide portion 66*a*. Therefore, as compared with a comparison example, the vibration of the movable pulley 72 can be reduced. Also, in the opening/closing apparatus 21, the holder main body portion 66*b* is provided so as to be shifted to a side of the driving drum 51 with respect to the slide portion 66, whereby the sliding resistance is generated between the guide shaft 65 and the slide portion 66*a*. Therefore, the vibration of the movable pulley 72 can be reduced. For this reason, as depicted in FIG. 12, in the opening/closing apparatus 21, even when a rapid change of the tension of the cable causes movement speed of the sliding door 13 to be changed in a vibrating manner, the vibration of door speed can be efficiently converged as compared with the comparison example represented by a broken line of the drawing, whereby the sliding door 13 can be smoothly operated.

Thus, in the opening/closing apparatus 21, the guide shaft 65 is tilted with respect to the direction of the load applied to the movable pulley 72 from the cables 24*a* and 24*b*, thereby causing the sliding resistance to be generated between the guide shaft 65 and the slide portion 66*a*. By this sliding resistance, the vibration of the movable pulley 72 in the direction extending along the guide shaft 65 due to a change of the tensions of the cables 24*a* and 24 can be suppressed. Therefore, the sliding door 13 can be smoothly operated.

Also, in the opening/closing apparatus 21, since the axial direction of the guide shaft 65 is tilted by approximately 45 degrees with respect to the direction of the load applied to the movable pulley 72 from the cables 24*a* and 24*b*, the slide portion 66*a* can be smoothly operated along the guide shaft 65 while the appropriate sliding resistance is generated between the guide shaft 65 and the slide portion 66*a*.

Furthermore, in the opening/closing apparatus 21, the holder main body portion 66*b* is provided so as to be shifted to the side of the driving drum 51 with respect to the slide portion 66*a*. Therefore, the slide portion 66*a* can be smoothly operated along the guide shaft 65 while the appropriate sliding resistance is generated between the guide shaft 65 and the slide portion 66*a*.

Still further, in the opening/closing apparatus 21, the axial center of the holder main body portion 66*b* is provided so as to be shifted toward the spring 68 along the axial direction of the guide shaft 65 with respect to an axial-directional center position of the slide portion 66*a*, so that the slide portion 66*a* is biased in a direction of being tilted with respect to the guide shaft 65 due to the load applied to the movable pulley 72 from the cables 24*a* and 24*b*, whereby the sliding resistance can be increased between the guide shaft 65 and the slide portion 66*a*. For this reason, a damping force of the slide portion 66*a* to the guide shaft 65 is increased, and the vibration of the movable pulley 72 in the direction extending along the guide shaft 65 can be further efficiently suppressed.

Still further, in the opening/closing apparatus 21, the holder main body portion 66*b* is provided so as to be shifted toward the driving drum 51 with respect to the slide portion 66*a*, thereby causing the sliding resistance to be generated between the guide shaft 65 and the slide portion 66*a*. Therefore, by this sliding resistance, the vibration of the movable pulley 72 in the direction extending along the guide shaft 65 due to the change of the tensions of the cables 24*a* and 24*b* can be suppressed. Thus, the sliding door 13 can be smoothly operated.

Still further, in the opening/closing apparatus 21, the tensioner mechanisms 63*a* and 63*b* are assembled to the tensioner housing 62 while being unitized in advance. Therefore, the operation of assembling these tensioner mechanisms 63*a* and 63*b* to the main body case 25 can be easily performed.

Figure 13A:
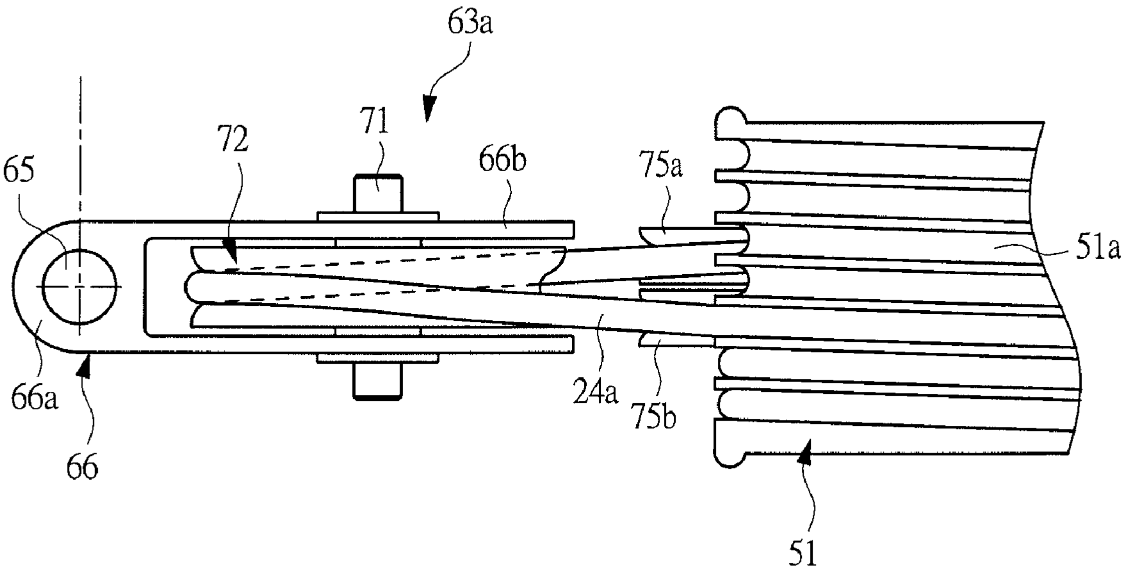
FIG. 13A is an explanatory drawing showing a rotating operation of a movable pulley.
Figure 13B:
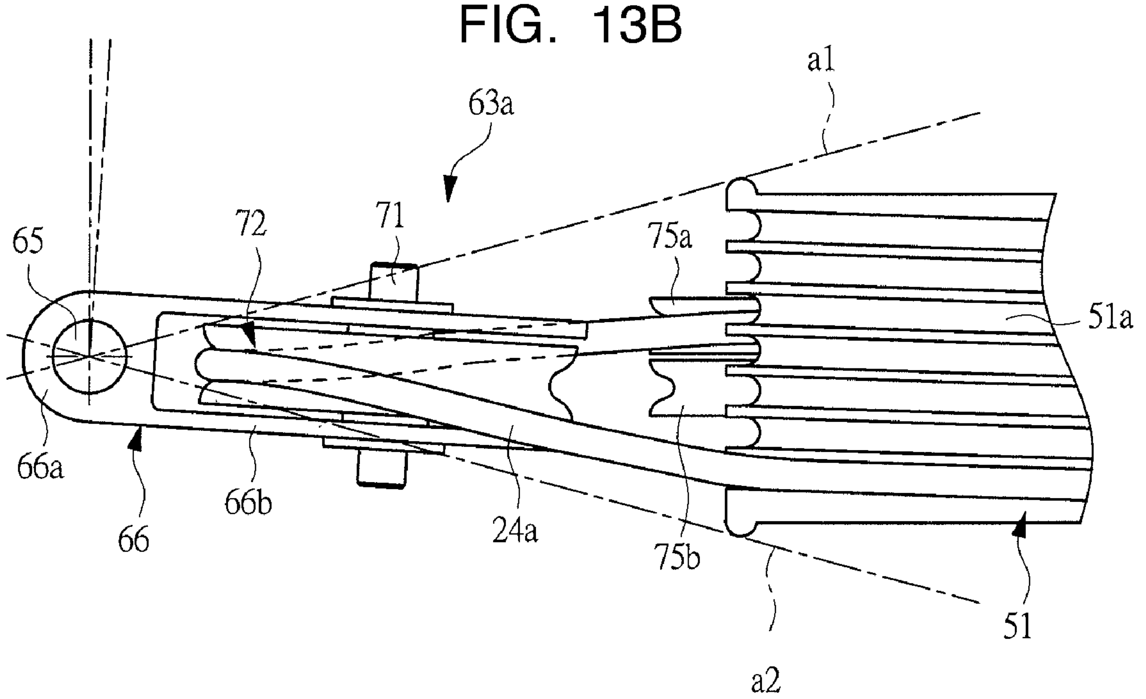
FIG. 13B is an explanatory drawing showing a rotating operation of a movable pulley.

Each of FIGS. 13A and 13B is an explanatory drawing for describing a rotating operation of the movable pulley.

In the opening/closing apparatus 21, when the driving drum 51 rotates, the drawing positions of the cables 24*a* and 24*b* from the driving drum 51 are varied in the axial direction. For this reason, in the tensioner mechanisms 63*a* and 63*b* provided in the opening/closing apparatus 21, as described above, the slide portion 66*a* of the pulley holder 66 is mounted on the guide shaft 65 so as to be rotatable about the guide shaft 65, whereby even if the drawing positions of the cables 24*a* and 24*b* from the driving drum 51 are varied, the movable pulley 72 is caused to follow the cables 24*a* and 24*b*. That is, as depicted in FIG. 13A, when the drawing position of the cable 24*a* from the driving drum 51 is at an approximately intermediate position of the driving drum 51 in its axial direction, the movable pulley 72 is positioned between the drawing position of the cable 24*a* from the driving drum 51 and an axial-directional position of the fixed pulley 75*a*. From this state, when the driving drum 51 rotates and the drawing position of the cable 24*a* is moved up to an end portion of the driving drum 51 in its axial direction, as depicted in FIG. 13B, the movable pulley 72 rotates about the guide shaft 65 along with the pulley holder 66 and is positioned between the drawing position from the driving drum 51 and the fixed pulley 75*a*. Thus, the movable pulley 72 follows the change of the drawing position of the cable 24*a* from the driving drum 51, and rotates about the guide shaft 65 together with the pulley holder 66. Also, since the supporting shaft 71 that supports the movable pulley 72 abuts on the main body case 25 or cover 64, a rotation range of the pulley holder 66 is regulated within a range of an angle formed between line segments a1 and a2 for connecting the axial center of the guide shaft 65 and the respective axial-directional end portions of the driving drum 51. Therefore, the movable pulley 72 is intended to be prevented from excessively rotate.

Therefore, even when the drawing position of the cable 24*a* from the driving drum 51 is varied, a tilt of the movable pulley 72 to the cable 24*a*, that is, a tilt of the cable 24*a* in a tangential direction of the movable pulley 72 is reduced, whereby any sliding sound can be prevented from occurring between the movable pulley 72 and the cable 24*a*. Also, since the cable 24*a* is not excessively tilted with respect to the movable pulley 72, a dimension of the movable pulley 72 in the axial direction can be reduced and the opening/closing apparatus 21 can be downsized.

In this manner, in the opening/closing apparatus 21, the pulley holder 66 rotatably holding the movable pulley 72 is rotatably mounted on the guide shaft 65 so as to be centered about the axial center of the guide shaft 65. Therefore, even when the drawing positions of the cables 24*a* and 24*b* from the driving drum 51 are changed axially according to the rotation of the driving drum 51, the movable pulley 72 can move in a tilted manner according to the movement of the cables 24*a* and 24*b*. Thus, the tilt of the movable pulley 72 to the cables 24*a* and 24*b* can be maintained small, whereby the sliding sound between the movable pulley 72 and the cables 24*a* and 24*b* can be reduced. Also, since the tilt of the movable pulley 72 to the cables 24*a* and 24*b* can be maintained small, even when the dimension of the movable pulley 72 is made small in the axial direction, it is possible to prevent the cables 24*a* and 24*b* from being released from the movable pulley 72. For this reason, the axial-directional dimension of the movable pulley 72 is made small, and the main body case 25 is made thinner in the axial direction of the driving shaft 35, whereby the opening/closing apparatus 21 can be downsized. Still further, when the axial-directional dimension of the movable pulley 72 is reduced, the positions of the cables 24*a* and 24*b* inside the groove 72*a* of the movable pulley 72 are stabilized. Therefore, the rubbing sound between the movable pulley 72 and the cables 24*a* and 24*b* can be further reduced, operation resistance of the cables 24*a* and 24*b* is reduced, and further the operations of the cables 24*a* and 24*b* can be stabilized.

Figure 14:
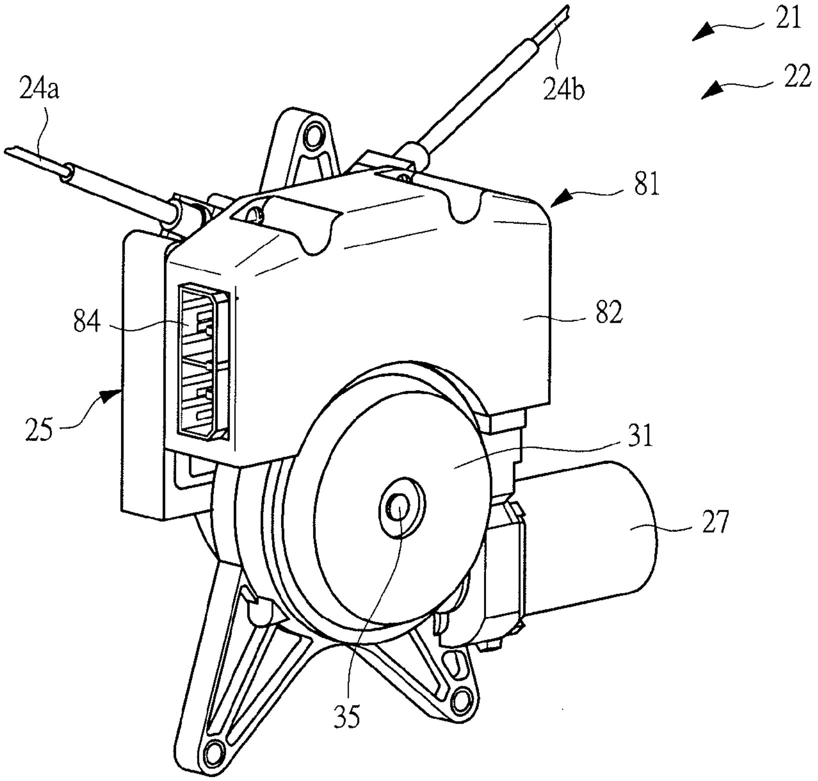
FIG. 14 is a perspective view in which the driving unit depicted in FIG. 3 is viewed from a rear side.
Figure 15:
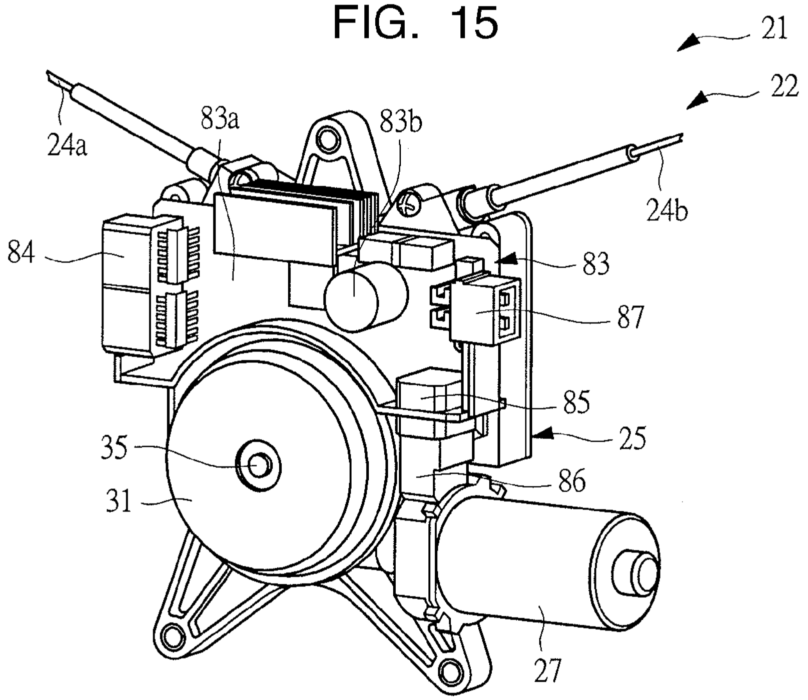
FIG. 15 is a perspective view showing a state where a substrate case depicted in FIG. 14 is removed.

FIG. 14 is a perspective view in which the driving unit depicted in FIG. 3 is viewed from a rear side, and FIG. 15 is a perspective view showing a state where the substrate case depicted in FIG. 14 is removed.

The driving unit 22 is provided with a control device 81 in order to control operations of the electric motor 27 and the electromagnetic clutch 41. As evident from FIG. 4, the control device 81 includes a substrate case 82 fixed to the main body case 25, and a control substrate 83 accommodated in the substrate case 82.

As depicted in FIG. 15, the control substrate 83 has a structure in which electronic components 83*b* such as a CPU and a memory are implemented on a substrate 83*a*. Via an external connector 84 provided on the substrate 83*a*, the control substrate 83 is connected to a battery, an open/close switch, or the like (not shown) which are mounted in the vehicle body. Also, a power-feeding connector 85 is provided on the substrate 83*a*. This power-feeding connector 85 is connected to a motor-side connector 86 provided to the electric motor 27. Furthermore, a clutch connector 87 is further provided on the substrate 83*a*. This clutch connector 87 is connected to a clutch-side connector (not shown) from the electromagnetic clutch 41.

When an open/close switch (not shown) is operated, its operation signal is inputted to the control substrate 83. The control substrate 83 supplies, to the electric motor 27 via the power-feeding connector 85 and the motor-side connector 86, power supplied from the battery according to the operation signal, thereby controlling the operation of the electric motor 27. Also, the control substrate 83 supplies, to the electromagnetic clutch 41 via the clutch connector 87 and the clutch-side connector, power supplied from the battery at desired timing, thereby controlling the operation of the electromagnetic clutch 41.

Here, as depicted in FIG. 4, in the main body case 25, the reduction-mechanism housing 28 accommodating the electromagnetic clutch 41 and the tensioner housing 62 are formed into such an approximately L shape in section as to be disposed in the axial direction and the diameter direction with respect to the drum housing 33, respectively. The control device 81 is positioned so as to overlap an axial-directional side of the driving drum 51 with respect to the tensioner housing 62 of the main body case 25, and disposed in a side direction of the reduction mechanism. That is, the control device 81 is disposed in a dead space obtained by partitioning a portion where the reduction-mechanism housing 28 is provided and a portion where the tensioner housing 62 is provided in the main body case 25. For this reason, a projection area of the driving unit 22 viewed from the axial direction of the driving drum 51 is reduced, thereby reducing a space occupied by the driving unit 22.

In this manner, in the opening/closing apparatus 21, the control device 81 is disposed so as to overlap the axial-directional side of the driving drum 51 with respect to the portion accommodating the tensioner mechanisms 63*a* and 63*b* of the main body case 25. Therefore, the projection area of the driving drum 51 viewed from the axial direction is reduced, whereby the opening/closing apparatus 21 can be downsized. Also, since the control device 81 is disposed in the dead space of the driving unit 22, the space occupied by the driving unit 22 can be reduced.

Also, in the opening/closing apparatus 21, the control device 81 is configured in such a manner that the control substrate 83 is accommodated inside the substrate case 82 fixed to the main body case 25. Therefore, the main body case 25 and the control device 81 can be integrally configured, whereby the opening/closing apparatus 21 can be downsized.

Furthermore, in the opening/closing apparatus 21, the control substrate 83 is accommodated in the substrate case 82 fixed to the main body case 25. Therefore, the power-feeding connector 85 of the control substrate 83 and the motor-side connector 86 of the electric motor 27 can be directly connected. For this reason, an external harness or the like for connecting the power-feeding connector 85 and the motor-side connector 86 is not required, whereby the cost of the opening/closing apparatus 21 can be reduced.

Next, an operation of the above-configured opening/closing apparatus 21 will be described.

When the open/close switch (not shown) is operated on open side and an instruction signal for operating the sliding door 13 to an open direction is inputted to the control substrate 83, the electromagnetic clutch 41 is switched to a connection state. Next, the electric motor 27 is driven in a normal rotating direction to cause the driving drum 51 to rotate in a clockwise direction in FIG. 3. Then, the open-side cable 24*a* is reeled by the driving drum 51, and the sliding door 13 is drawn by the open-side cable 24*a* and moved toward the full-open position. Reversely, when the open/close switch is operated on a close side and an instruction signal for operating the sliding door 13 in a close direction is inputted to the control substrate 83, the electromagnetic clutch 41 is switched to the connection state. Next, the electric motor 27 is driven in a reverse rotating direction to cause the driving drum 51 to rotate in a counterclockwise direction in FIG. 3. Then, the close-side cable 24*a* is reeled by the driving drum 51, and the sliding door 13 is drawn by the close-side cable 24*b* and moved toward the full-close position. Also, when the sliding door 13 is manually operated for opening and closing, the electromagnetic clutch 41 is switched to an intermitted state while the electric motor 27 is stopped.

On the other hand, for example, when the sliding door 13 is opened or closed automatically or manually and the roller assembly 15 passes through the curve portion 14*a* of the guide rail 14 to change the length of the drawing paths of the cables 24*a* and 24*b*, the movable pulley 72 moves along the guide shaft 65 in the axial direction and the tensions of the cables 24*a* and 24*b* are adjusted within a predetermined range.

Figure 16:
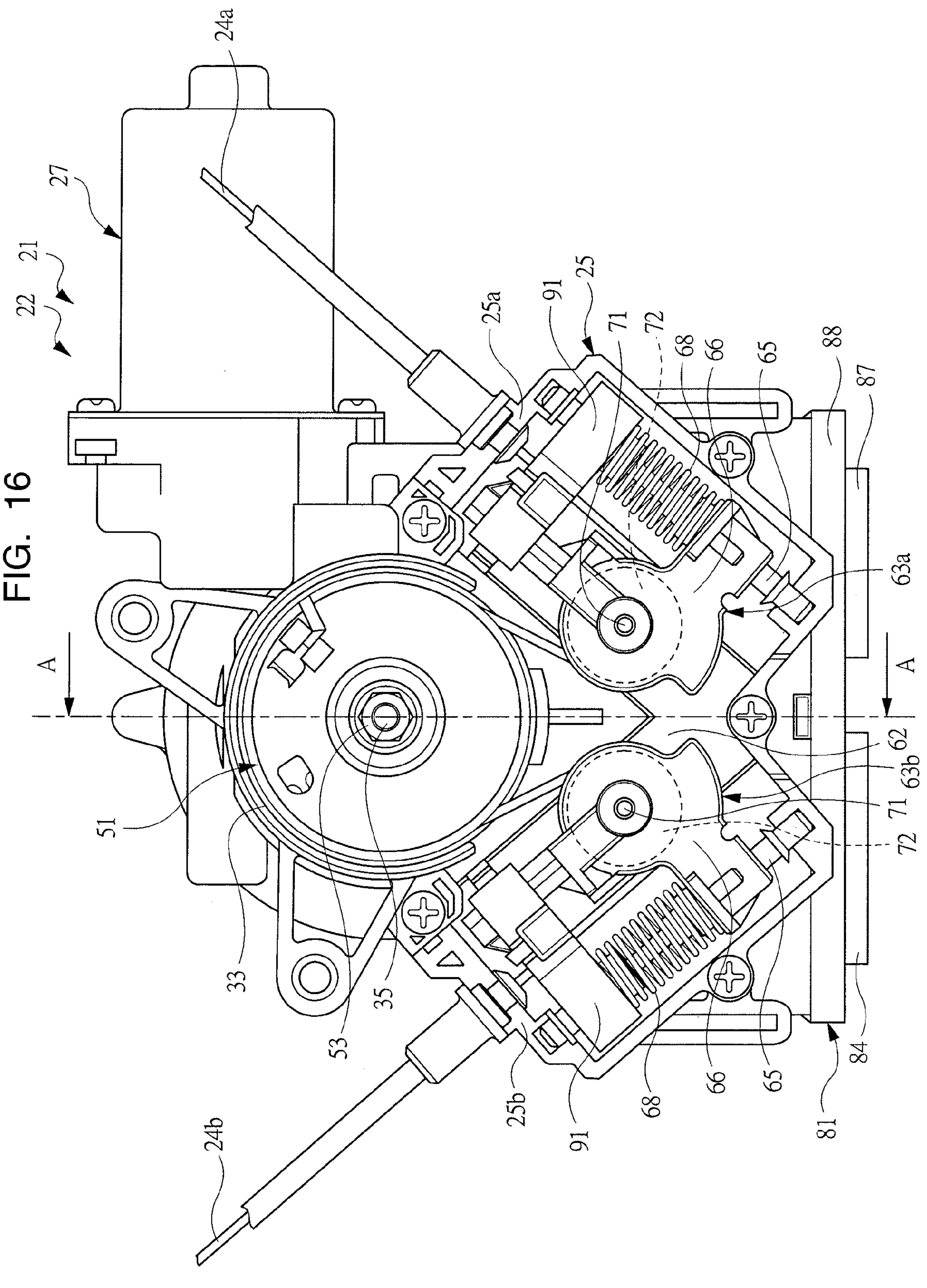
FIG. 16 is a front view showing a modification example of the driving unit depicted in FIG. 3.
Figure 17:
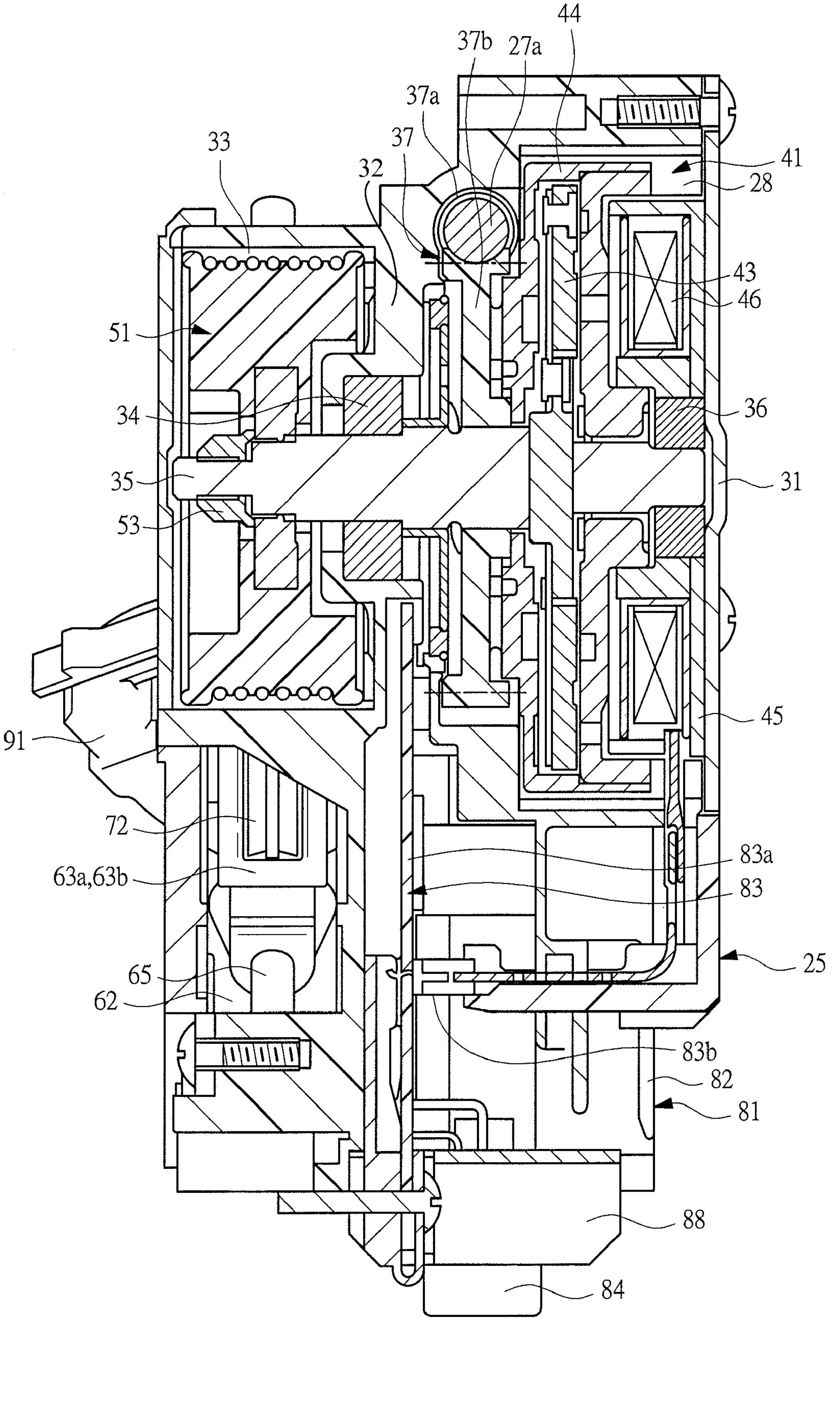
FIG. 17 is a sectional view taken along line A-A in FIG. 16.

FIG. 16 is a front view showing a modification example of the driving unit depicted in FIG. 3, and FIG. 17 is a sectional view taken along line A-A in FIG. 16.

In the driving unit 22 depicted in FIG. 3, the guide shafts 65 of the tensioner mechanisms 63*a* and 63*b* are disposed in parallel with each other, and the movable pulleys 72 are operated in parallel with each other along the guide shaft 65. Simultaneously, the cables 24*a* and 24*b* drawn in the main body case 25 from the cable drawing portions 25*a* and 25*b* are wound about the movable pulley 72 via the fixed pulleys 75*a* and 75*b*, respectively.

On the other hand, in a modification example depicted in FIG. 16, the guide shafts 65 are disposed so that their axial directions are shifted by approximately 90 degrees from each other; the movable pulleys 72 are each operated along the guide shaft 65 in a direction extending along the relevant one of the cable drawing portions 25*a* and 25*b*; and the cables 24*a* and 24*b* drawn in the main body case 25 from the cable drawing portions 25*a* and 25*b* are guided to the driving drum 51 by reversing their moving directions up to 180 degrees by each movable pulley 72. For this reason, a change in angles with respect to the drawing directions of the cables 24*a* and 24*b* occurring in operating the movable pulleys 72 can suppressed to reduce the moving space, and the spaces for disposing the tensioner mechanism 63*a* and 63*b* are reduced, whereby the opening/closing apparatus 21 can be downsized.

Also, in this modification example, the main body case 25 is integrally provided with the reduction-mechanism housing 28, the drum housing 33, and the substrate case 82 for incorporating the control substrate 83. Inside the substrate case 82, the power-feeding connector (not shown) provided on the substrate 83*a* of the control substrate 83 is connected to a motor-side terminal (not shown) led from the electric motor 27. Furthermore, an opening portion of the substrate case 82 in the main body case 25 is enclosed by the substrate cover 88. This substrate cover 88 is provided with the external connector 84 connected to the control substrate 83. The control substrate 83 is connected via the external connector 84 to power supply such as a battery (not shown) mounted in the vehicle 11 and/or to an open/close switch disposed inside the vehicle compartment.

Incidentally, the reference numeral "91" denotes a stopper that holds the pulley holder 66 at a position where the spring 68 becomes in a contracted state in order to generate sag margins of the cables 24*a* and 24*b* when the cables 24*a* and 24*b* are coupled to the roller assembly 15 of the sliding door 12.

Also in this modification example, as depicted in FIG. 17, the main body case 25 is formed into such an approximately L shape in section that the reduction-mechanism housing 28 is disposed to be aligned in the axial direction with respect to the drum housing 33 for accommodating the driving drum 51, and that the tensioner housing 62 for accommodating the tensioner mechanisms 63*a* and 63*b* is disposed to be aligned in the diameter direction. The control device 81 for controlling the operations of the electric motor 27 and the electromagnetic clutch 41 is disposed at a position of being overlapped on the axial-directional side of the driving drum 51 with respect to the tensioner housing 62 of the main body case 25 and disposed in the side direction of the reduction-mechanism housing 28. For this reason, as with the case depicted in FIG. 3, the projection area of the driving unit 22 viewed from the axial direction of the driving drum 51 is reduced, whereby the space occupied by the driving unit 22 is reduced.

Incidentally, in FIGS. 16 and 17, members corresponding to those described above are denoted by the same reference numerals.

The present invention is not limited to the above embodiment and, needless to say, can be variously modified within a scope of not departing from the gist thereof. For example, in the present embodiment, the open/close member is the sliding door 13 that is opened and closed in a sliding manner. However, the present invention is not limited to this, and may adopt another open/close member such as a hinge-type door that is opened and closed horizontally for loading and unloading and a back door provided at a rear end portion of the vehicle.

Also, in the present embodiment, two cables, that is, the open-side cable 24*a* and the close-side cable 24*b* are used. However, the present invention is not limited to this, and may a structure in which an intermediate portion of one cable is wound around the driving drum 51, and both ends thereof are connected to the sliding door 13.

What is claimed is:

1. An automatic opening/closing apparatus for vehicle, automatically opening and closing an open/close member provided to a vehicle body, the apparatus comprising:

a main body case disposed in the vehicle body;

a driving rotor member accommodated in the main body case, and driven for rotation by a driving source;

a cable member whose one end is wound around the driving rotor member and whose the other end is connected to the open/close member;

a tensioner mechanism accommodated in the main body case so as to be adjacent to the driving rotor member in a diameter direction, the tensioner mechanism applying a predetermined tension to the cable member; and a control device disposed so as to be overlapped on an axial-directional side of the driving rotor member with respect to a portion of the main body case for accommodating the tensioner mechanism, the control device controlling an operation of the driving source, wherein the main body case is provided with a reduction-mechanism housing accommodating a reduction mechanism for decelerating rotation of the driving source, and the control device is provided in a side direction of the reduction-mechanism housing, wherein the main body case, the reduction-mechanism housing and the tensioner housing are formed into such an approximately L shape in section as to be disposed in the axial direction and the diameter direction with respect to the drum housing, respectively, and wherein the control device is disposed in a dead space obtained by partitioning a portion where the reduction-mechanism housing is provided and a portion where the tensioner housing is provided in the main body case.

2. The automatic opening/closing apparatus for vehicle according to claim 1, wherein the control device includes a substrate case fixed to the main body case, and a control substrate accommodated in the substrate case.

* * * * *